United States Patent
Fahldieck

(10) Patent No.: US 8,844,586 B2
(45) Date of Patent: Sep. 30, 2014

(54) RETAINING BRACE HAVING A CLAMP FOR GRASPING BOTTLE NECKS

(75) Inventor: Andreas Fahldieck, Idar-Oberstein (DE)

(73) Assignee: KHS GmbH, Dortmund (DE)

( * ) Notice: Subject to any disclaimer, the term of this patent is extended or adjusted under 35 U.S.C. 154(b) by 18 days.

(21) Appl. No.: 13/320,929

(22) PCT Filed: May 21, 2010

(86) PCT No.: PCT/EP2010/003149
§ 371 (c)(1),
(2), (4) Date: Nov. 17, 2011

(87) PCT Pub. No.: WO2011/023253
PCT Pub. Date: Mar. 3, 2011

(65) Prior Publication Data
US 2012/0056062 A1     Mar. 8, 2012

(30) Foreign Application Priority Data
Aug. 31, 2009 (DE) .......................... 10 2009 038 987

(51) Int. Cl.
*B67C 3/24* (2006.01)
*B65G 47/92* (2006.01)

(52) U.S. Cl.
USPC ..... 141/165; 141/129; 198/472.1; 248/309.4; 248/316.7

(58) Field of Classification Search
USPC ............. 248/309.1, 316.7, 309.2, 309.4, 312, 248/312.1, 313, 206.5, 230.7; 198/472.1, 198/468.5, 476.1, 803.6, 807.04, 867.04, 198/379.1; 141/165, 372, 129; 224/183; 294/90, 106, 198
See application file for complete search history.

(56) References Cited

U.S. PATENT DOCUMENTS

| | | | |
|---|---|---|---|
| 7,784,603 B2* | 8/2010 | Burgmeier | 198/472.1 |
| 8,297,671 B2* | 10/2012 | Knieling et al. | 294/90 |
| 8,387,773 B2* | 3/2013 | Fahldieck | 198/472.1 |
| 2008/0272609 A1 | 11/2008 | Knieling et al. | |
| 2011/0180374 A1 | 7/2011 | Fahldieck | |
| 2011/0308666 A1* | 12/2011 | Bodtl nder et al. | 141/165 |

FOREIGN PATENT DOCUMENTS

| | | |
|---|---|---|
| DE | 3713013 | 10/1988 |
| DE | 202005002924 | 5/2006 |
| DE | 102005014838 | 10/2006 |
| DE | 102005041929 | 3/2007 |
| DE | 102006012020 | 9/2007 |
| DE | 102008019766 | 4/2009 |
| DE | 102008055617 | 7/2011 |
| GB | 2204571 | 11/1988 |
| WO | 2006/102983 | 10/2006 |
| WO | 2010/060499 | 6/2010 |

* cited by examiner

*Primary Examiner* — Tan Le
(74) *Attorney, Agent, or Firm* — Occhiuti & Rohlicek LLP

(57) ABSTRACT

A retaining bracket used in bottle processing includes a clamp having clamp arms that pivot in a horizontal plane for grasping bottle necks, a sliding sleeve for receiving a hinge pin entering therein from an upward direction, the hinge pin having a magnetizable or magnetically free end, a first permanent magnet disposed in a lower region of the sleeve for interacting with the free end of the hinge pin, a pivotable sleeve for receiving a second pin parallel to the hinge pin, the second pin having, at a free end thereof, a permanent magnet or magnetically influenced region that exerts an attractive force tending to center and restore the clamp, and a brace-like projection that engages below the clamp when the clamp is in a locked position.

3 Claims, 2 Drawing Sheets

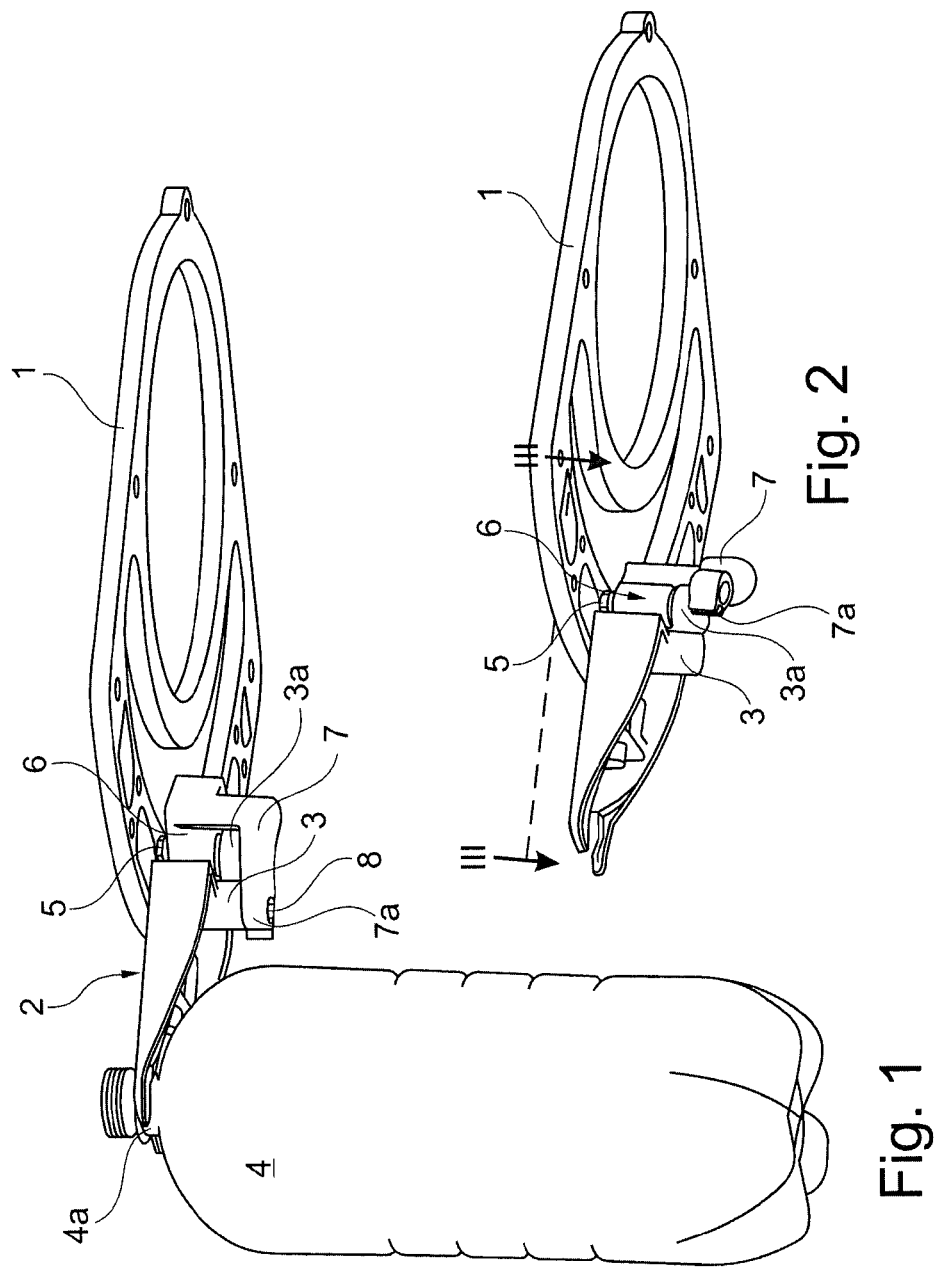

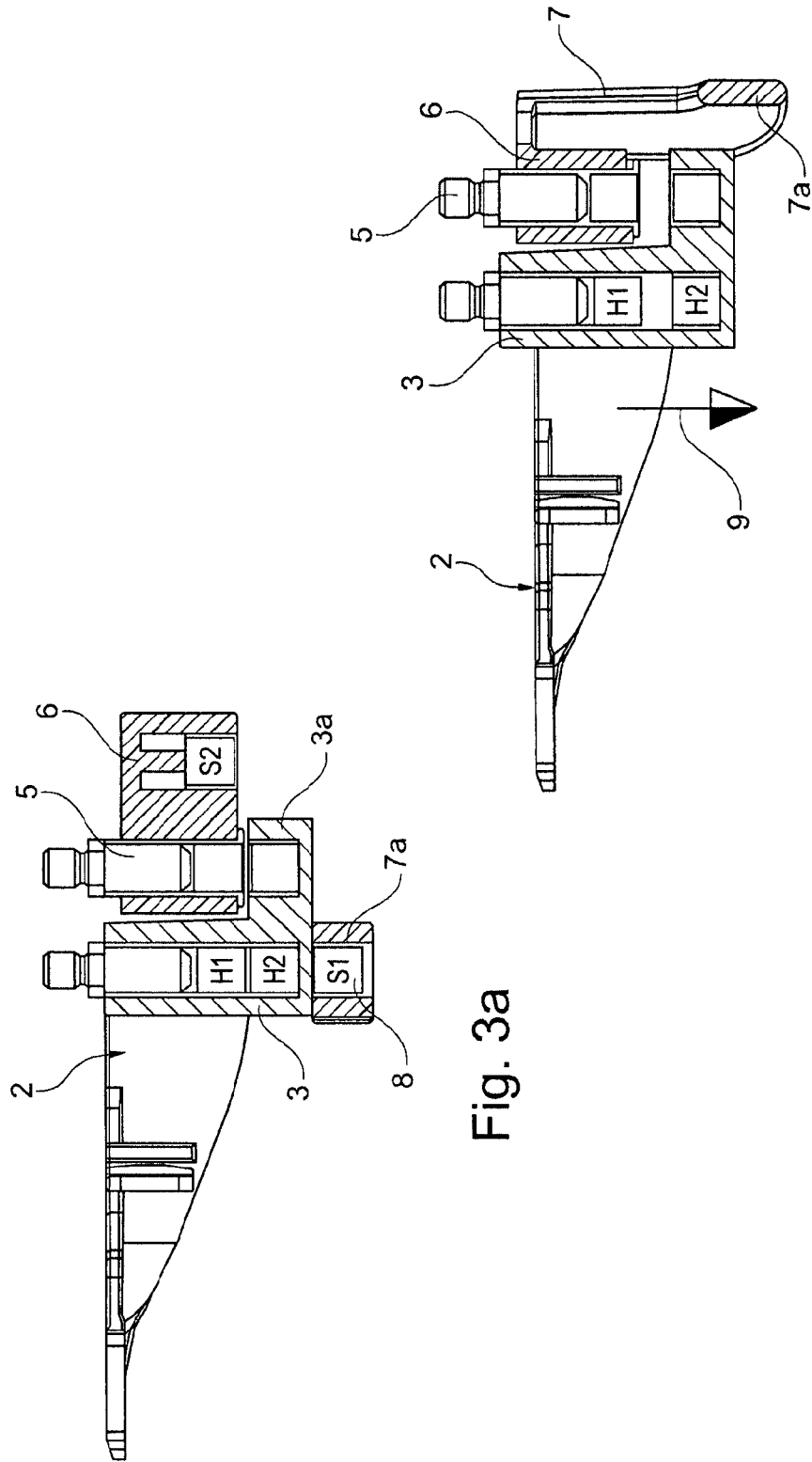

RETAINING BRACE HAVING A CLAMP FOR GRASPING BOTTLE NECKS

CROSS REFERENCE TO RELATED APPLICATIONS

This application claims priority to international application no. PCT/EP2010/003149, filed May 21, 2010, which claims the priority of German application no. 10 2009 038 987.3, filed Aug. 31, 2009. Both applications are incorporated herein by reference.

FIELD OF INVENTION

The invention relates to a retaining brace having a clamp for grasping bottle necks, in particular of PET bottles, in bottling plants, wherein the clamp arms are pivotable in the horizontal plane, wherein the clamp comprises a sliding sleeve for engaging with a hinge pin on the star or the like, said pin engaging in the sliding sleeve from above, and the hinge pin is equipped with a magnetizable or magnetic free end, and wherein a permanent magnet that interacts with the hinge pin is positioned in the lower region of the sliding sleeve.

BACKGROUND

The invention proceeds from a generic clamp, as described in DE 10 2008 055 617.

As described therein, such clamps are available in very different configurations. For example DE 10 2006 012 020 discloses a pair of clamps, wherein the two clamp arms are pivotable in non-separate axes and the clamp is kept in the closed position by means of a spring. Since such spring elements often do not meet the hygiene requirements placed on bottling plants, efforts are being made to propose other closing mechanisms. For instance, in a complicated configuration, DE 10 2005 041 929 provides permanent magnets that, in different pairings, assist both the closing operation and the opening operation. In this solution, the permanent magnets are positioned outside the grasping arms of the clamps.

In order to assist the opening force of the clamps, a solution according to DE 20 2005 002 924 U or DE 10 2005 014 838 A provides that repelling magnets are positioned between the grasping area of the clamps and the pivot axes.

SUMMARY

The object of the present invention is in particular to expand the range of use of such clamps or clips in that they should be suitable not only for empty containers but rather also for filled bottles or other receiving containers having a corresponding neck shape, so that these clamps can additionally be used in fillers and transfer stars between fillers and cappers.

Such an object is achieved according to the invention in that, provided on the star or the like, is a second pin parallel to the pivot pin and having at its free end a permanent magnet or a magnetically influenced region that exerts an attractive force in order to center and restore the clamp, wherein this pin is surrounded by a pivotable sleeve that is provided with a brace-like projection that engages below the clamp in the use position.

By providing a pivotable sleeve with a projection that engages below the clamp, an additional securing element is provided, so that even relatively heavy objects can be held without there being any possible risk of detachment of the clamps from the rotating or conveying device in question. In addition, the manner of assembly in the form of a plug-in system is optimally retained.

In order to increase the holding forces, the invention provides, in one embodiment, that provided in the brace-like projection is a permanent magnet that, in the use position, can be positioned coaxially relative to the hinge pin and interacts with the permanent magnet in the clamp.

The invention also provides that, provided on the pivotable sleeve on the side opposite the brace-like projection is a further projection, with a permanent magnet, that serves for stabilizing the clamp in the use position.

As already indicated above, the invention has some particular advantages. The bottle clamps can be rapidly changed, for example, without the need for a tool. The bottle clamps are easy to clean, inexpensive to retrofit, and can be used in a versatile manner as a standard part on a wide range of installation elements, such as in the star, the rinser, the transfer star in the filler, and the star in front of the capper. This leads to a considerable cost saving. In addition, the clamp is always magnetically pivoted into the locked position so that damage to the machine due to operating errors can be avoided.

The sleeve may be of two designs. It may be equipped with the magnets described above for centering purposes, or else the clamp may dip inwards in a suitable configuration, so that the clamp is fixed laterally, which simplifies use on the filler.

DESCRIPTION OF THE DRAWINGS

Further details, features and advantages of the invention will become apparent from the following description and on the basis of the drawings. In the drawings:

FIG. 1 shows the bottom view of a conveying element with a clamp according to the invention and a held bottle, FIG. 2 shows a three-dimensional bottom view with a clamp without a bottle and with the brace-like insert pivoted away, and FIGS. 3a and 3b show a cross section along line III-III in FIG. 2 through the retaining brace in two different positions of the securing projection.

DETAILED DESCRIPTION

On a machine element 1, which may be for example an element of a filler, of a transfer star, of a capper or the like, which is of no further significance here, the clamp 2 according to the invention is pushed from below into pivoting and retaining pins that penetrate into sleeves 3.

The clamp 2 is designed, for example, for transporting a PET bottle 4, but it can also grasp and convey other containers, wherein it grasps the corresponding neck, denoted 4a in FIG. 1. Fixed on the machine element 1 is a second retaining pin 5 that is surrounded by a pivoting body 6 in which a brace 7 is integrally molded, said brace being pivoted with its free projection 7a, which is optionally equipped with a permanent magnet 8, below the cylinder 3 assigned to the clamp 2. The two pivot positions can be seen in FIGS. 1 and 2.

The cylinder 3 of the clamp has an integrally molded projection 3a that may once again be equipped with a permanent magnet in order thus to interact with the pivot pin 5 or the corresponding sleeve, which in turn may once again contain a permanent magnet.

During assembly, the 5clamp 2, with its sliding sleeve 3 and the integrally molded projection 3a, is pushed from below over the corresponding pins on the machine element 1 once the retaining brace 6 has been pushed over the second pin 5 on the machine element 1. For fixing purposes, the brace projection 7a is then pivoted below the rotating sleeve 3 of the clamp 2, as can be seen from FIG. 1, in order to apply an additional retaining force to prevent any slipping of the clamp 2.

In FIGS. 3a and 3b, the two positions of the pivoting body 6 with the brace 7 and the free projection 7a, which can be seen in FIG. 1 and FIG. 2, are shown in cross section, showing details of the different magnets that are optionally provided.

The locked position achieved by the brace is shown in FIG. 3a. The magnet H1 is securely seated in a corresponding sleeve on the star (not shown in greater detail), the magnet H2 is securely seated in the bottle clamp 2, and the two magnets hold the bottle clamp 2 by virtue of an attractive force. Although this fixing is already sufficient to hold the clamp itself with empty bottles, in order to exert a greater holding force the free projection 7a with a magnet 8 or "S1" is pivoted below the sleeve 3 and can thus exert an additional holding force. This magnet S1 is securely seated in the projection of the retaining brace in the locked position.

FIG. 3b shows the situation according to FIG. 2 in which the brace 7 with the projection 7a is pivoted away so that the sleeve 3 with the clamp 2 can be pulled off in the downward direction, e.g. for maintenance work or the like. The possibility of being pulled off in the downward direction is indicated by an arrow 9.

Of course, the described example of an embodiment of the invention can be modified in many ways without departing from the basic concept. For example, the projection 7a of the brace arm 7 may be configured without a permanent magnet 8 and may be shaped in such a way that it secures the rotary sleeve 3 of the brace 2 from below.

The invention claimed is:

1. An apparatus for use in a bottle processing plant, said apparatus comprising: a retaining bracket including a clamp having clamp arms that pivot in a horizontal plane for grasping bottle necks, a sliding sleeve for receiving a hinge pin entering therein from an upward direction, said hinge pin having a magnetizable or magnetic free end, a first permanent magnet disposed in a lower region of said sleeve for interacting with said free end of said hinge pin, a pivotable sleeve for receiving a second pin parallel to said hinge pin, said second pin having, at a free end thereof, a permanent magnet or magnetically influenced region that exerts an attractive force tending to center and restore said clamp, and a brace-like projection that engages below said clamp when said clamp is in a locked position.

2. The apparatus of claim 1, further comprising a second permanent magnet provided in said brace-like projection, said second permanent magnet, in said locked position, positioned coaxial to said hinge pin for interacting with said first permanent magnet.

3. The apparatus of claim 1, wherein the pivotable sleeve comprises, on a side opposite the brace-like projection, a further projection, the further projection including a permanent magnet for stabilizing the clamp in the lock position.

\* \* \* \* \*